April 19, 1960
T. F. JONES, JR., ET AL
2,933,673
MAGNETIC AMPLIFIER CONTROL SYSTEM
Filed March 28, 1955
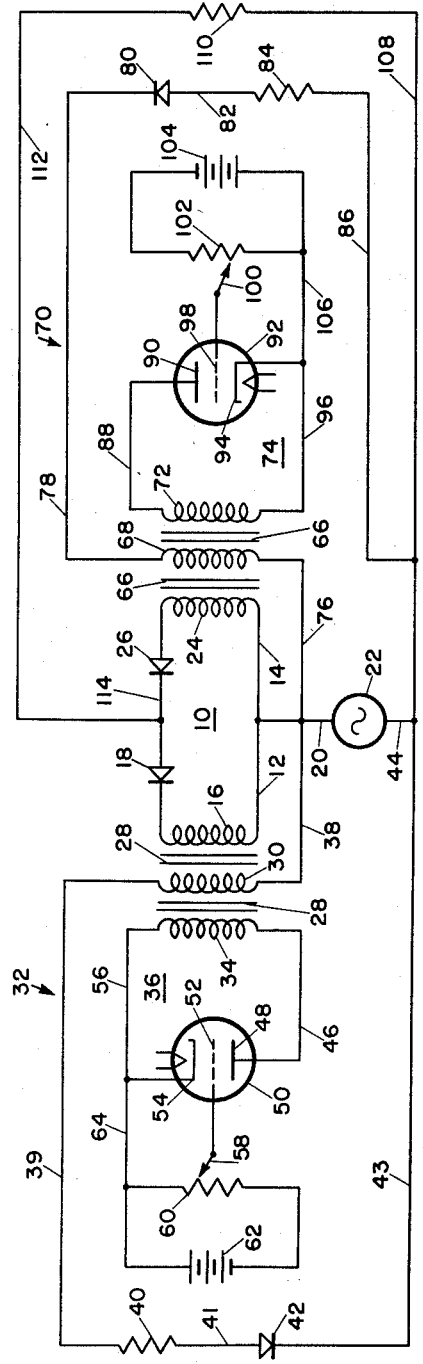
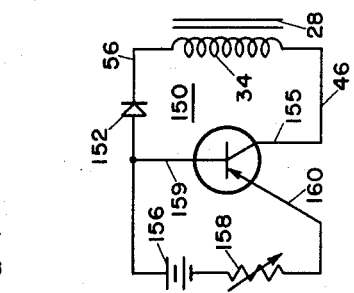
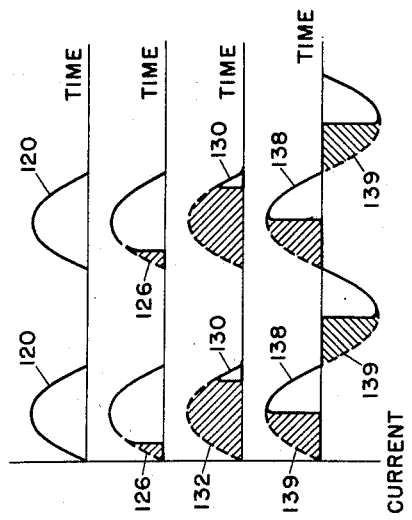
INVENTOR.
THOMAS F. JONES, JR., HARRY G. WILLIAMS
BY *Walter J. Kreske*
ATTORNEY United States Patent Office 2,933,673
Patented Apr. 19, 1960

2,933,673

MAGNETIC AMPLIFIER CONTROL SYSTEM

Thomas F. Jones, Jr., Squantum, and Harry G. Williams, Scituate, Mass., assignors to General Electronic Laboratories, Inc., Cambridge, Mass., a corporation of Massachusetts Application March 28, 1955, Serial No. 497,093

7 Claims. (Cl. 323—89)

This invention relates to magnetic core inductive type circuits for controlling power to a load.

Magnetic core inductively coupled circuits in combination with unidirectional current devices may be used with alternating current power sources to control the magnitude of power feed to a load. Such circuits, herein termed magnetic amplifiers, depend for their power controlling characteristics upon the magnetic state of the core at the time of each conduction half-cycle of the associated unidirectional current device. For example, if the core is substantially saturated with magnetic flux in the proper direction at the beginning of the conduction half-cycle of the associated unidirectional current device, a maximum load current will be obtained. On the other hand, if the magnetic state of the core at the beginning of the conduction half-cycle of the associated unidirectional current device is at any other than this directional saturated condition, the load current will be smaller than the above maximum. The amount by which the load current is thereby decreased will depend on how far below this saturated state the core is at the beginning of the conduction half-cycle of the associated unidirectional current device. Thus, by resetting the magnetic state of the core during the non-conduction half-cycle of the associated unidirectional current device, the load current magnitude may be controlled. The effectiveness of such an arrangement as a current, and thereby a power controlling, device depends on the degree of control which may be maintained over the magnetic state of the core. Among the problems in this regard is the dissipation of residual core magnetism by leakage across the unidirectional current device, as for example a rectifier, used in the magnetic amplifier circuit. Because of this rectifier leakage, the magnetic state of the core at the start of each conduction half-cycle is normally below the desired level for achieving maximum output current.

Pursuant to the present invention, a circuit arrangement has been devised for resetting the magnetic state of the core in magnetic amplifiers after each conduction half-cycle which reduces the effect of the rectifier leakage and rectifier leakage variation to almost negligible importance and achieves other important objects and advantages.

Among these other objects is a circuit arrangement which may reset the core throughout a wide range of magnetic states.

Another object is a circuit arrangement which may reset the core at selectable increments from a high magnetic level in one direction to a high magnetic level in the opposite direction.

A further object is a circuit arrangement which is sensitive to even small incremental reset selections and which may be easily set for a desired load current.

Still further objects are a circuit arrangement which is reliable in its operation, entails relatively few components and lends itself to relatively inexpensive manufacture.

These objects and advantages are achieved generally by providing a reset circuit inductively coupled to the core of the magnetic amplifier and having a rectifier in series with the inductive coupling for restricting current flow in the inductive coupling to a direction which tends to create a flux in the core opposed in direction to the magnetic flux created by the magnetic-amplifier output current, and a control arrangement for the reset circuit for limiting the magnitude of reset in the core.

By making the control arrangement in the form of a control circuit inductively coupled to the core with a device in the circuit for limiting current flow through the control inductance to selectable values of current in a direction which tends to create magnetic flux in the core of the same polarity as that caused by the magnetic amplifier current, a reliable reset controlling arrangement is achieved.

By making the device in the control circuit in the form of a grid controlled electron tube with variable voltage means for biasing the control grid of the tube a relatively simple, sensitive control circuit is thereby achieved which is easy to set for even small incremental selections in magnitude of reset of the core.

By providing a resistor in the reset circuit for limiting the current flow through the reset inductive coupling, the maximum reset condition of the core is thereby limited to a selected magnitude within which the control circuit may operate.

By providing two magnetic amplifiers in parallel in the form of a doubler in the power circuit with a rectifier in each leg of the doubler and arranged to pass current in one leg of the doubler during the positive half cycle of the alternating power current and in the other leg of the doubler during the negative half cycle of the alternating power current, and providing a reset and control circuit for each leg of the doubler, effective control of the magnitude of load current over the entire current cycle is thereby achieved.

These and other features, objects and advantages of the present invention will become more apparent from the following description taken in connection with the accompanying drawings wherein;

Fig. 1 is a schematic view of a magnetic amplifier doubler in a power circuit with each leg of the doubler having a reset and control circuit in accordance with a preferred embodiment of the present invention.

Fig. 2 is a diagram of an exemplary hysteresis loop characteristic of the magnetic core of a magnetic amplifier such as shown in Fig. 1.

Fig. 3 is a diagram illustrating the effect of core reset on the load current in the power circuit.

Fig. 4 is a diagram illustrating an alternative construction in the present invention.

Referring to Fig. 1 in more detail, the numeral 10 shows a magnetic amplifier doubler comprised of two parallel connected current carrying legs 12 and 14 respectively. The leg 12 has a series connected inductive winding 16 and a unidirectional current valve, as a rectifier 18. The rectifier 18 restricts current flow through the inductive winding 16 to the negative half cycle of current appearing in line 20 from an alternating current power source 22 which is connected to legs 12 and 14 by the line 20. The power source 22 may be a conventional 60 cycle, 110 volt generator, though other cyclic and voltage rates may be used. In similar manner an inductive winding 24 is connected in series with a unidirectional current valve, as a rectifier 26 in leg 14 of the doubler 10. The rectifier 26 is positioned in leg 14 in a manner to restrict current flow through the inductive winding 24 during the positive current half cycle appearing in line 20.

The winding 16 in leg 12 has a magnetic core 28 which is preferably made with a square hysteresis loop characteristic such as shown in Fig. 2 where H is magnetic field intensity and B is magnetic flux density. It should be understood, however, that while a square hysteresis loop characteristic is preferred, such a characteristic is not critical to the operation of the present invention. Other shapes of hysteresis loop characteristics may also be used. An exemplary core 28 which is suitable for the present purpose is one made of toroidal shape having a spirally wound thin metal ribbon thereon. With the metal ribbon being of grain oriented 50% nickel and 50% iron alloy a saturation hysteresis loop having a high degree of squareness as mentioned above is obtained.

The magnetic core 28 is also common to an inductive winding 30 in a reset circuit 32 and an inductive winding 34 in a control circuit 36.

The reset winding 30 is connected at one end through a line 38 to line 20. The other end of the reset winding 30 is connected through a line 39, bias resistor 40, line 41, a unidirectional current device as rectifier 42 and lines 43 and 44 to the other terminal of the alternating current power source 22. The rectifier 42 is positioned so as to restrict current flow through the winding 30 in a direction opposite to the direction of current flow in the winding 16. Thus, when the power current half cycle in line 20 is positive the rectifier 42 will be conductive and will pass current through the winding 30. Since the direction of this current through winding 30 is opposite to that of the current which had passed through the winding 16 in the previous half cycle, as explained above, the current through winding 30 will tend to create magnetic flux in core 28 in a direction opposite to that created by the current in winding 16.

The control winding 34 is connected at one end through line 46 to anode 48 of an electron tube 50 such as a triode having a control grid 52. The electron tube 50 has a cathode 54 which is connected through line 56 and anode 48 connected to the control winding 34 as shown, it will be noted that the triode 50 restricts current flow through the control winding 34 to the same direction as current flow through the magnetic amplifier winding 16. Thus, current flow through the winding 34 will tend to create magnetic flux in the core 28 in the same direction as that created by the above mentioned current flow through the winding 16.

The magnitude of the current flow across anode 48 and cathode 54 may be suitably controlled and varied by connecting the control grid 52 through a resistance adjusting arm 58 to a potentiometer resistance 60 which is connected across a power source such as a battery 62. The positive terminal of the battery 62 is connected through line 64 to the cathode 54 of the tube 50 to provide a proper reference potential for the bias at the control grid 52.

Referring now to the other leg 14 with its associated circuits, the magnetic amplifier winding 24 has a magnetic core 66 preferably similar to the core 28 referred to above. The core 66 is common to a reset winding 68 in a reset circuit 70 similar to the reset circuit 32, and a control winding 72 in a control circuit 74 preferably similar to the control circuit 36. One end of the reset winding 68 is connected through line 76 to line 20 and thereby to one terminal of the alternating current power source 22. The other end of the reset winding 68 is connected through a line 78, a unidirectional current valve such as a rectifier 80, a line 82, a bias resistor 84 and a line 86 to line 44 and thereby to the other terminal of the alternating current power source 22. The rectifier 80 is positioned to restrict current flow through the reset winding 68 to a direction opposite to the direction of current flow in the magnetic amplifier winding 24. Thus, current will flow through the winding 68 during the power current half cycle following that through winding 24. This current through winding 68 will tend to create magnetic flux in the core 66 in a direction opposite that created by the current through winding 24.

The control winding 72 is connected at one end through a line 88 to an anode 90 of an electron tube 92 such as a triode having a cathode 94 connected through a line 96 to the other end of the control winding 72. Connection of the triode 92 restricts current flow through the control winding 72 to a direction the same as that through winding 24. Thus, current flowing through the winding 72 will tend to create magnetic flux in the core 68 in the same direction as that created by the current through the magnetic amplifier winding 24.

A control grid 98 in the triode 92 is connected through a resistance adjusting arm 100 to a potentiometer resistance 102 which is connected across a power source such as a battery 104, the positive terminal of which is connected through a line 106 to the cathode 94 of tube 92.

The line 44 from the alternating current power source 22 is connected through a line 108 to one side of a load 110. The other side of load 110 is connected through a line 112 to a line 114 between the rectifiers 18 and 26 in the magnetic amplifier doubler 10.

In operation, assuming no leakage across the rectifier 26 in the leg 14 of the doubler 10, the magnetic core 66 which has preferably a square hysteresis loop characteristic such as shown by the curve 115 in Fig. 2, would normally be maintained in a substantially saturated condition indicated by the asymptotic portion 116 of the hysteresis loop 115. At the termination of each positive current half cycle in the magnetic amplifier winding 24, the residual magnetic state of the core returns to point 118 which is the intersection of the saturation curve 116 with the B axis which corresponds to a zero current condition. Thus, under this ideal condition of no rectifier leakage, the positive half cycles 120 (Fig. 3) of current delivered by the power source 22 will be at a maximum value.

Since, however, as a practical matter, some leakage across the rectifier 26 will occur during the negative current half cycle, the magnetic core 66 will experience a partial resetting below that of the zero current condition. The extent of the resetting will depend upon the leakage through the rectifier 26 and the magnetic state of the core may fall back to a point 122 on the hysteresis loop 115. Thus during conduction of the following positive current half cycle through the winding 24 the flux density in the core will follow a path such as shown by dotted line 124. There will therefore be a resulting diminished load current 125 during each positive half cycle. The amount by which the load current is diminished is illustrated by the shaded areas 126 (Fig. 3).

Since the rectifier 80 is oriented in the reset circuit 70 in such manner that current will flow through the reset circuit 70 during the negative current half cycle, the flux density of the core 66 will normally be further reset to a position below the point 122 during each negative half cycle of current flow. With no current flow in the control circuit 74 the extent of this additional reset may be limited by the ohmic value of the bias resistance 84 in the reset circuit 70. The ohmic value of the bias resistance 84 is so chosen as to create a selected maximum reset in the core 66 such as to a point 128 on the hysteresis loop 115 which will give a desired minimum load current 130 (Fig. 3) for each positive half cycle. The shaded area 132 (Fig. 3) shows approximately the amount by which the load current is diminished from the maximum possible current during each half cycle as the magnetic state of the core changes from point 128 along an approximate path shown by the dotted line 134.

During each negative current half cycle, the current flow through the reset winding 68 will induce a voltage across the control winding 72 in the control circuit 74. This induced voltage will appear across the triode 92 which will become conductive to an extent determined by the bias of grid 98 which is selectably set by arm 100 on the potentiometer resistance 102. Because of the shunting or short circuiting effect of conduction in the triode 92, the voltage distribution in the reset circuit 70 is altered in such manner that a larger portion of the voltage appears across the bias resistance 84 and a smaller portion appears across the reset winding 68. As a result, the magnitude of reset in the core 66 will be smaller than the maximum obtainable when the triode 92 is non-conductive. As conduction in the control circuit 74 increases, the magnitude of reset of the core 66 by the reset circuit 70 is decreased. Thus, by controlling the bias potential at the grid 98 conduction in the control circuit 74 and thereby the extent of reset of the core 66 within the selected range may be obtained.

It will be noted that it is during this negative current half cycle that the troublesome leakage across the rectifier 26 occurs. However, the importance of this leakage with applicants' core reset arrangement is minimized. Just as conduction across the control winding 72 causes a decrease in potential across the reset winding 68, so also the leakage current through winding 24 will have a similar effect on the winding 66 and thereby it similarly tends to diminish the effect of the leakage. Thus, the range of reset values in the core 66 obtainable is wider than that existing between the point 122 and 128 in Fig. 2 and will extend above 122 to some point 136. This may be seen more clearly when it is considered that an approximation of the operation of applicants' reset and control arrangement may be simulated by a triode connected across the winding 24 and a resistor connected in parallel with the rectifier 26. In this approximation, the triode would act as a shunt with respect to the winding 24 during the negative half cycle.

The operation of the leg 12 of the doubler 10 is similar to that just described in connection with the leg 14 except in that it operates on the opposite half cycles of the power supply. Considering therefore the complete cycle and identical settings for control grid 52 in the control circuit 36 and the control grid 98 in the control circuit 74 for a selected reset point the load current will appear as shown by the curve 138 (Fig. 3). The size of the shaded portions 139 will depend upon the particular reset point as explained above. While operation of the magnetic amplifier as a doubler 10 is normally preferred because of the complete cyclic output, it may be used for half cycle operation with a single leg such as either leg 12 or 14 with the corresponding reset and control circuits.

In a second embodiment of the invention, the control circuit 36 with its voltage controlled triode 50 is replaced by a control circuit 150. In the control circuit 150, the combination of a diode 152 in line 56 and a transistor 154 with its collector 155 connected in line 46 are used in place of the triode 50. The diode 152 is oriented in line 56 to confine current flow in the winding 34 to the same direction as the current flow in winding 116. A current source such as a battery 156 in series with a variable resistance 158 are connected across the base 159 and emitter 160 of the transistor 154 for biasing the emitter 160 to thereby provide a means for controlling the magnitude of current flow through the inductive winding 34.

In similar manner the control circuit 150 may also be substituted for the control circuit 74 in Fig. 1.

The invention is not limited to the particular details of construction, materials and processes described as equivalents will suggest themselves to those skilled in the art.

What is claimed is:

1. In combination, three electrical windings about a magnetic core, a first circuit for feeding a unidirectional portion of alternating current power to a load, unidirectional current means in said circuit, one of said windings in series with said unidirectional current means, a second circuit in series with another of said windings and in parallel with said first circuit, unidirectional current means in said second circuit for confining current flow in said other winding to a direction for causing magnetic flux in said core opposed to that caused by the unidirectional current in said first winding, means for limiting the magnitude of current flow in said second circuit, a triode in shunt with the last of said windings, said triode being oriented to be supplied by the voltage induced in said last winding by current in said second winding.

2. In combination, three electrical windings about a magnetic core, a first circuit for feeding a unidirectional portion of alternating current power to a load, a rectifier in said circuit for confining current flow to substantially a single direction, one of said windings in series with said rectifier, a second circuit in series with another of said windings and in parallel with said first circuit, a rectifier in said second circuit for confining current flow in said other winding to a direction for causing magnetic flux in said core opposite to that caused by the unidirectional current in said first winding, means for limiting the magnitude of current flow in said second circuit, a third circuit in series with the last of said windings, a grid controlled vacuum tube in shunt with the third winding and oriented to confine current flow in said third winding to a direction causing magnetic flux in said core in the same direction as that caused by the unidirectional current in said first circuit, and means coupled to said grid for controlling the magnitude of current flow in said third circuit.

3. In a magnetic amplifier of the type which depends for its operation on the resetting of the magnetic state of a magnetic core having an inductive winding for operation with an alternating current source and a unidirectional current valve for restricting current flow through said winding to substantially a unidirectional half cycle of said alternating current, a reset circuit in parallel with said inductive winding and inductively coupled to said core, means in said reset circuit for restricting current flow through the reset inductive coupling to substantially the other half cycle of said alternating current, and absorption type control means coupled to said reset circuit for controlling the magnitude of reset of said magnetic core by said reset circuit.

4. In a magnetic amplifier of the type which depends for its operation on the resetting of the magnetic state of a magnetic core having an inductive winding for operation with an alternating current source and a unidirectional current valve for restricting current flow through said winding to substantially a unidirectional half cycle of said alternating current, a reset circuit in parallel with said inductive winding and inductively coupled to said core, means in said reset circuit for restricting current flow through the reset inductive coupling to substantially the other half cycle of said alternating current, a control circuit inductively coupled to said magnetic core, and unidirectional current means in shunt with the inductive coupling in said control circuit for restricting current flow through the inductive coupling of said control circuit to both a direction opposing the reset of said core and a selected magnitude determined by induced voltage across the inductive coupling of said control circuit.

5. In a magnetic amplifier of the type which depends for its operation on the resetting of the magnetic state of a magnetic core having an inductive winding for operation with an alternating current source and a unidirectional current valve for restricting current flow through said winding to substantially a unidirectional half cycle of said alternating current, a reset circuit in parallel with said inductive winding and inductively coupled to said core, means in said reset circuit for restricting current flow through the reset inductive coupling to substantially the other half cycle of said alternating current, means in said reset circuit for limiting the magnitude of current flow through the reset inductive coupling to a selected maximum reset condition, a control circuit inductively coupled to said core, and unidirectional current means in shunt with the inductive coupling in said control circuit for restricting current flow through the inductive coupling of said control circuit to both a direction opposing the reset of said core and a selected magnitude determined by induced voltage across the inductive coupling of said control circuit.

6. In a magnetic amplifier of the type which depends for its operation on the resetting of the magnetic state of a magnetic core having an inductive winding for operation with an alternating current source and a unidirectional current valve for restricting current flow throuh said winding to substantially a unidirectional half cycle of said alternating current, a reset circuit in parallel with said inductive winding and inductively coupled to said core, means in said reset circuit for restricting current flow through the reset inductive coupling to substantially the other half cycle of said alternating current, means in said reset circuit for limiting the magnitude of current flow through the reset inductive coupling to a selected maximum reset condition, a control circuit inductively coupled to said core, a grid controlled electron tube in shunt with the inductive coupling in said control circuit, said tube oriented to restrict current flow through the inductive coupling of said control circuit to a direction opposing the reset of said core, and means coupled to said control grid for permitting current flow through the inductive coupling of said control circuit in response to induced voltage across the inductive coupling of said control circuit.

7. In combination, an alternating current power source, a circuit for connecting said power source to a load, a magnetic cored doubler having two parallel connected legs in said circuit and forming a series closed loop across said power source and load, unidirectional current means in the series closed loop for making one of said legs conductive during one half cycle of current from said power source and the other of said legs conductive during the other half cycle of current from said power source, a reset circuit for each of the legs coupled across the power source and inductively coupled to the magnetic core in the respective leg, means in each of said reset circuits for confining current flow to a direction for resetting the magnetic state of the respective magnetic core, a resistor in each of said reset circuits for limiting the magnitude of reset, a control circuit inductively coupled to the magnetic core in each of said legs, a grid controlled electron tube in each of said control circuits in shunt with the last mentioned inductive coupling, and means for biasing said control grids for a selected value of reset of said magnetic cores.

References Cited in the file of this patent
UNITED STATES PATENTS

| | | |
|---|---|---|
| 2,503,039 | Glass | Apr. 4, 1950 |
| 2,745,055 | Woerdemann | May 8, 1956 |
| 2,760,148 | Sakamoto | Aug. 21, 1956 |
| 2,770,770 | Lufcy | Nov. 13, 1956 |
| 2,780,771 | Lee | Feb. 5, 1957 |
| 2,783,315 | Ramey | Feb. 26, 1957 |
| 2,809,343 | Pittman | Oct. 8, 1957 |
| 2,820,943 | Sanders | Jan. 21, 1958 |

OTHER REFERENCES

Publication: "Saturable Reactor Feedback Usage," Electronic Industries and Electronic Instrumentation, vol. 2, No. 6, June 1948, page 23.

Publication: "An Improved Magnetic Servo Amplifier," by C. W. Lufcy, A. E. Schmid and P. W. Barnhart; A.I.E.E. Transactions; vol. 71, part I; September 1952; pp. 281–289.